United States Patent
Minjeur et al.

(10) Patent No.: US 12,109,918 B2
(45) Date of Patent: Oct. 8, 2024

(54) INTEGRATED ACCESSIBILITY STORAGE SYSTEM

(71) Applicant: GM GLOBAL TECHNOLOGY OPERATIONS LLC, Detroit, MI (US)

(72) Inventors: Patrick Minjeur, Sterling Heights, MI (US); David M. Aller, Grosse Pointe Farms, MI (US); Christopher Stephen Flemming, Shelby Township, MI (US); Lisa M. Simms, Warren, MI (US); John Joseph Katona, Shelby Township, MI (US); Owen Rauch, Howell, MI (US); Siddhant Kansal, Hazel Park, MI (US); Zachariah Smith, Farmington Hills, MI (US); Paul W. Alexander, Ypsilanti, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 87 days.

(21) Appl. No.: 17/954,645

(22) Filed: Sep. 28, 2022

(65) Prior Publication Data
US 2024/0109462 A1   Apr. 4, 2024

(51) Int. Cl.
*B60N 2/20* (2006.01)
*B60N 2/02* (2006.01)
*B60R 7/04* (2006.01)

(52) U.S. Cl.
CPC ......... *B60N 2/206* (2013.01); *B60N 2/02246* (2023.08); *B60R 7/043* (2013.01)

(58) Field of Classification Search
CPC ...... B60N 2/206; B60N 2/02246; B60R 7/043
See application file for complete search history.

(56) References Cited

U.S. PATENT DOCUMENTS

| | | | | |
|---|---|---|---|---|
| 3,049,374 A | * | 8/1962 | Nance | B60N 3/004 297/146 |
| 4,159,071 A | * | 6/1979 | Roca | A47C 7/70 108/42 |
| 5,492,257 A | * | 2/1996 | Demick | B60R 7/02 296/37.16 |
| 6,540,295 B1 | * | 4/2003 | Saberan | B60N 2/309 297/344.21 |
| 2006/0208549 A1 | * | 9/2006 | Hancock | B60N 2/067 297/342 |
| 2007/0283855 A1 | * | 12/2007 | Pozzi | A47B 23/043 108/44 |
| 2013/0200668 A1 | * | 8/2013 | Michalak | B60N 2/22 297/341 |
| 2017/0021931 A1 | * | 1/2017 | Stephens | B64D 11/0638 |
| 2020/0398667 A1 | * | 12/2020 | Emura | G02B 27/01 |

\* cited by examiner

Primary Examiner — Mark R Wendell
(74) Attorney, Agent, or Firm — CANTOR COLBURN LLP

(57) ABSTRACT

A vehicle seat and storage system includes a vehicle seat having a seat base and a seat back extending from the seat base. A storage apparatus is connected to the seat back and is movable from a stowed position against the seat back to an extended position away from the seat back. The storage apparatus is configured to position and secure one or more cargo items. A seat motor is operably connected to the seat. The seat motor is configured to move the seat back from a first position extending upward from the seat base to a second position where the seat back is disposed flat against the seat base.

18 Claims, 8 Drawing Sheets

INTEGRATED ACCESSIBILITY STORAGE SYSTEM

INTRODUCTION

The subject disclosure relates to vehicles and more particularly to storage of accessibility devices, such as wheelchairs, mobility aids or the like in vehicles.

Vehicle operators often utilize mobility devices, such as wheelchairs or other mobility aids. Currently, such devices are merely placed in the vehicle with no practical way to secure the devices efficiently without taking additional time and/or effort to do so. Operators desire a robust and efficient storage solution for such devices and other accessories in the vehicle that does not require excess time or effort to utilize.

SUMMARY

In one embodiment, a vehicle seat assembly includes a seat base, a seat back extending from the seat base, and a storage apparatus connected to the seat back. The storage apparatus is movable from a stowed position against the seat back to an extended position away from the seat back. The storage apparatus is configured to position and secure one or more cargo items.

Additionally or alternatively, in this or other embodiments the storage apparatus includes an arm connected to the seat back at a first arm end and a second arm end. The arm is pivotably connected to the seat back to move from the stowed position to the extended position. A latch secures the arm in the stowed position.

Additionally or alternatively, in this or other embodiments an arm spring element biases the arm toward the extended position.

Additionally or alternatively, in this or other embodiments the arm includes one or more features to position and retain one or more cargo items at the arm.

Additionally or alternatively, in this or other embodiments a seat motor is configured to move the seat back from a first position extending upward from the seat base to a second position where the seat back is disposed flat against the seat base.

Additionally or alternatively, in this or other embodiments the seat motor is activated via a button on the seat.

Additionally or alternatively, in this or other embodiments the seat base is movable from a horizontal position to a vertical position via rotation of the seat base about a seat pivot.

In another embodiment, a vehicle seat and storage system includes a vehicle seat having a seat base and a seat back extending from the seat base. A storage apparatus is connected to the seat back and is movable from a stowed position against the seat back to an extended position away from the seat back. The storage apparatus is configured to position and secure one or more cargo items. A seat motor is operably connected to the seat. The seat motor is configured to move the seat back from a first position extending upward from the seat base to a second position where the seat back is disposed flat against the seat base.

Additionally or alternatively, in this or other embodiments a controller is operably connected to the vehicle seat and the seat motor. The controller is configured to determine if use of the storage system is needed, and commands movement of the seat back from the first position to the second position.

Additionally or alternatively, in this or other embodiments the determination is made via communication between the controller and one of a key fob or a smart phone application.

Additionally or alternatively, in this or other embodiments the storage apparatus includes an arm connected to the seat back at a first arm end and a second arm end. The arm is pivotably connected to the seat back to move from the stowed position to the extended position. A latch secures the arm in the stowed position.

Additionally or alternatively, in this or other embodiments an arm spring element biases the arm toward the extended position.

Additionally or alternatively, in this or other embodiments the arm includes one or more features to position and retain one or more cargo items at the arm.

Additionally or alternatively, in this or other embodiments the seat base is movable from a horizontal position to a vertical position via rotation of the seat base about a seat pivot.

In yet another embodiment, a method of operating a vehicle seat and storage apparatus includes determining a whether a vehicle operator requires use of the storage apparatus. The storage apparatus includes an arm connected to the seat back of a vehicle seat at a first arm end and a second arm end. The arm is pivotably connected to the seat back to move from a stowed position against the seat back to an extended position away from the seat back. A latch secures the arm in the stowed position. In the method, the seat is moved to a first position where the seat back is moved forward a selected amount, the latch is released to move the arm to the extended position, and one or more cargo items are secured to the arm. The seat is moved to a second position where the seat back is folded against the seat base, and the seat is moved to a third position where the seat base is moved from a horizontal orientation in the vehicle to a vertical orientation in the vehicle by rotating the seat about a seat pivot.

Additionally or alternatively, in this or other embodiments one or more additional cargo items are secured to one of a seat frame or the seat base when the seat base is in the vertical orientation.

Additionally or alternatively, in this or other embodiments a forward latch is released to move the seat base to the vertical orientation.

Additionally or alternatively, in this or other embodiments the arm moves to the extended position via a spring force.

Additionally or alternatively, in this or other embodiments the seat base is moved to the vertical orientation via a spring force.

Additionally or alternatively, in this or other embodiments the seat back is moved to the first position and the second position via operation of a seat motor.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
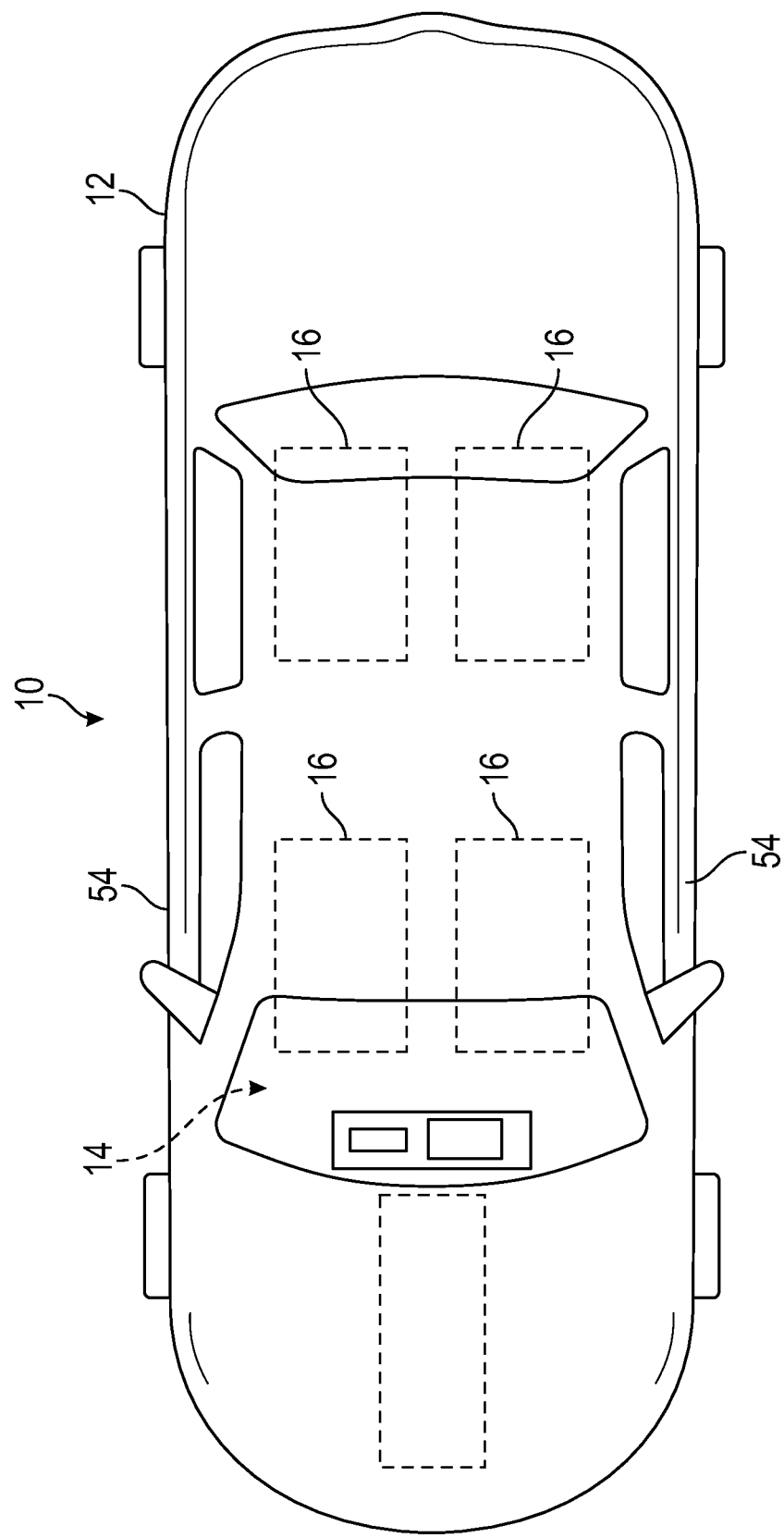
FIG. 1 is a plan view of an embodiment of a vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment, illustrated in FIG. 1 is a vehicle 10. Vehicle 10 includes a body 12 that defines an occupant compartment 14. The vehicle 10 further includes one or more seats 16 disposed in the occupant compartment 14 for use by an occupant.

Figure 2:
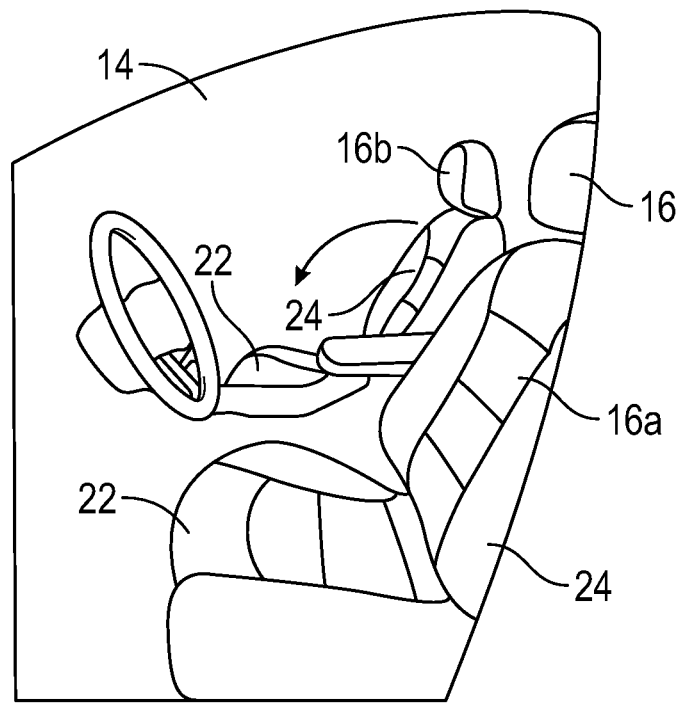
FIG. 2 is a is a first partial perspective view of an embodiment of an occupant compartment of a vehicle.
Figure 3:
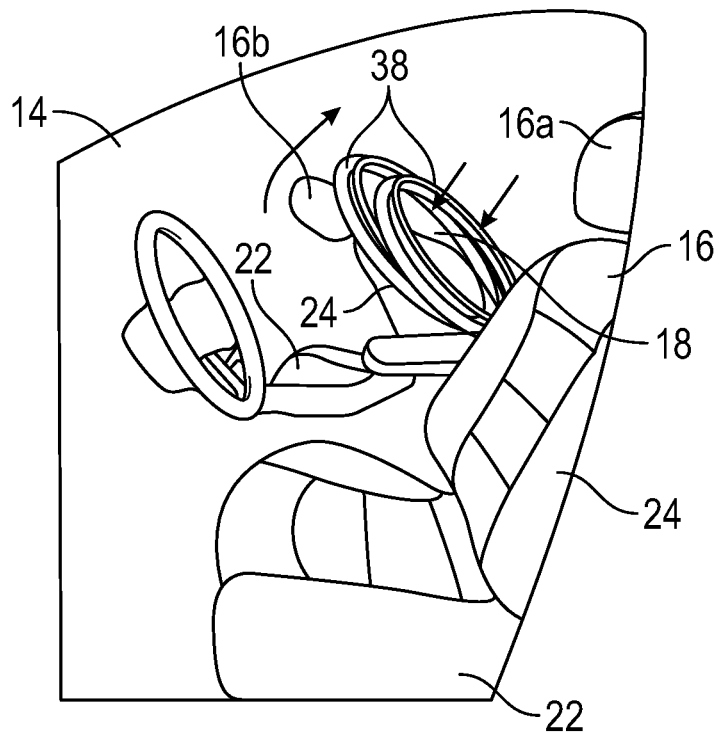
FIG. 3 is a second partial perspective view of an embodiment of an occupant compartment of a vehicle.

Referring now to FIG. 2, a partial side view of an exemplary occupant compartment 14 is illustrated. The partial view includes two seats 16. While two seats 16 are illustrated in FIG. 2, one skilled in the art will readily appreciate that other quantities of seats 16 may be present in the occupant compartment 14. The seats 16 in FIG. 2 include a driver's seat 16a and a front passenger seat 16b, with the front passenger seat 16b located laterally next to the driver's seat 16a, such as also shown in FIG. 1. Referring now to FIG. 3, one or more of the seats 16 is fitted with a storage apparatus 18. The storage apparatus 18 is configured to retain and secure one or more mobility devices or accessibility devices, such as wheelchair wheels 38 as shown in FIG. 3, which are removed from a wheelchair frame. While wheelchair wheels 38 are illustrated in FIG. 3, one skilled in the art will readily appreciate that the storage apparatus 18 may be utilized to secure and store other mobility aids and/or their components or accessories. The seats 16 each include a seat base 22 positioned generally horizontally in the vehicle 10 and a seat back 24 extending generally upwardly from the seat base 22. In some embodiments, the storage apparatus 18 is secured to or incorporated into the seat back 24.

Figure 4:
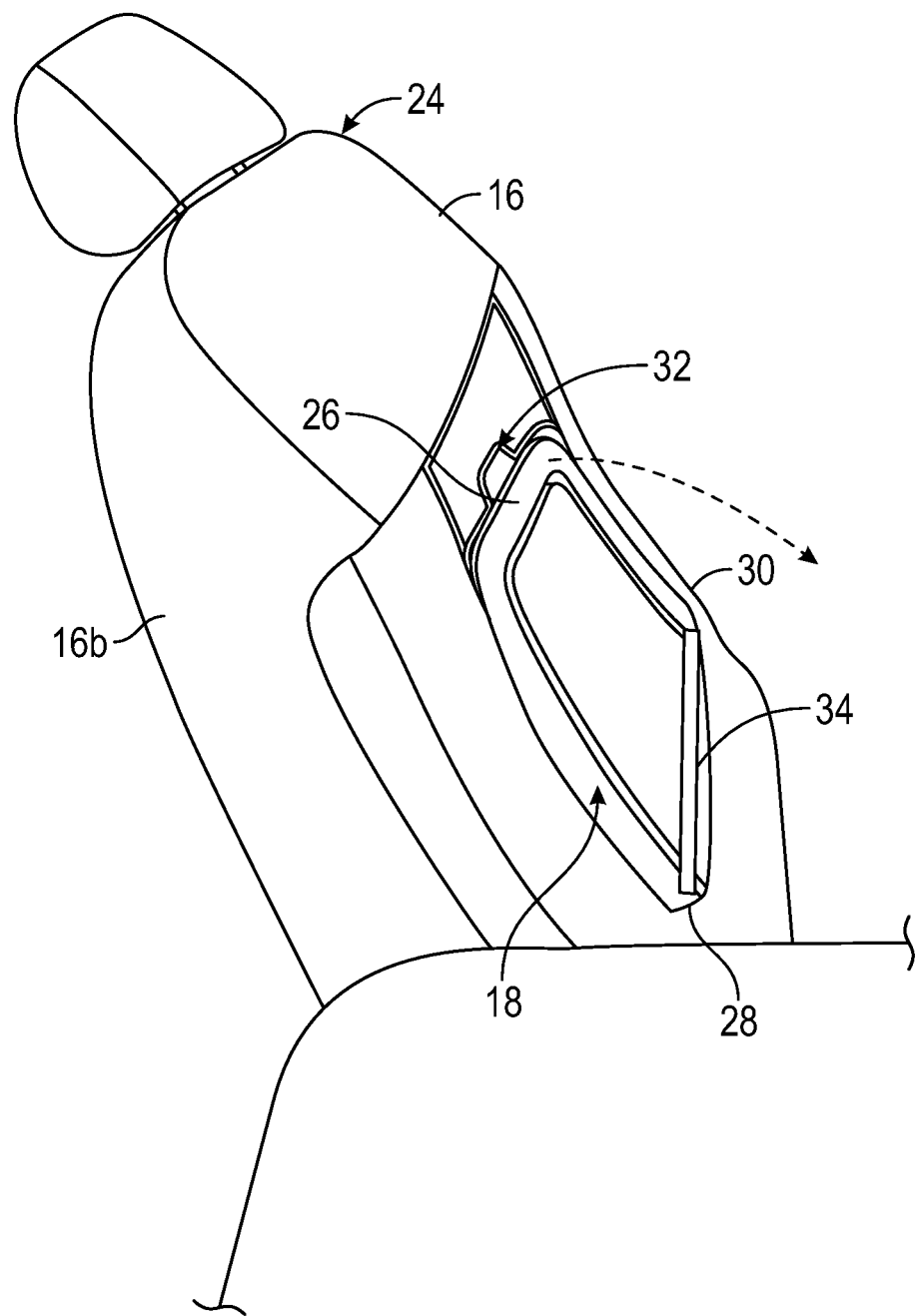
FIG. 4 is a first view of an embodiment of a storage apparatus at a seat back of a vehicle.
Figure 5:
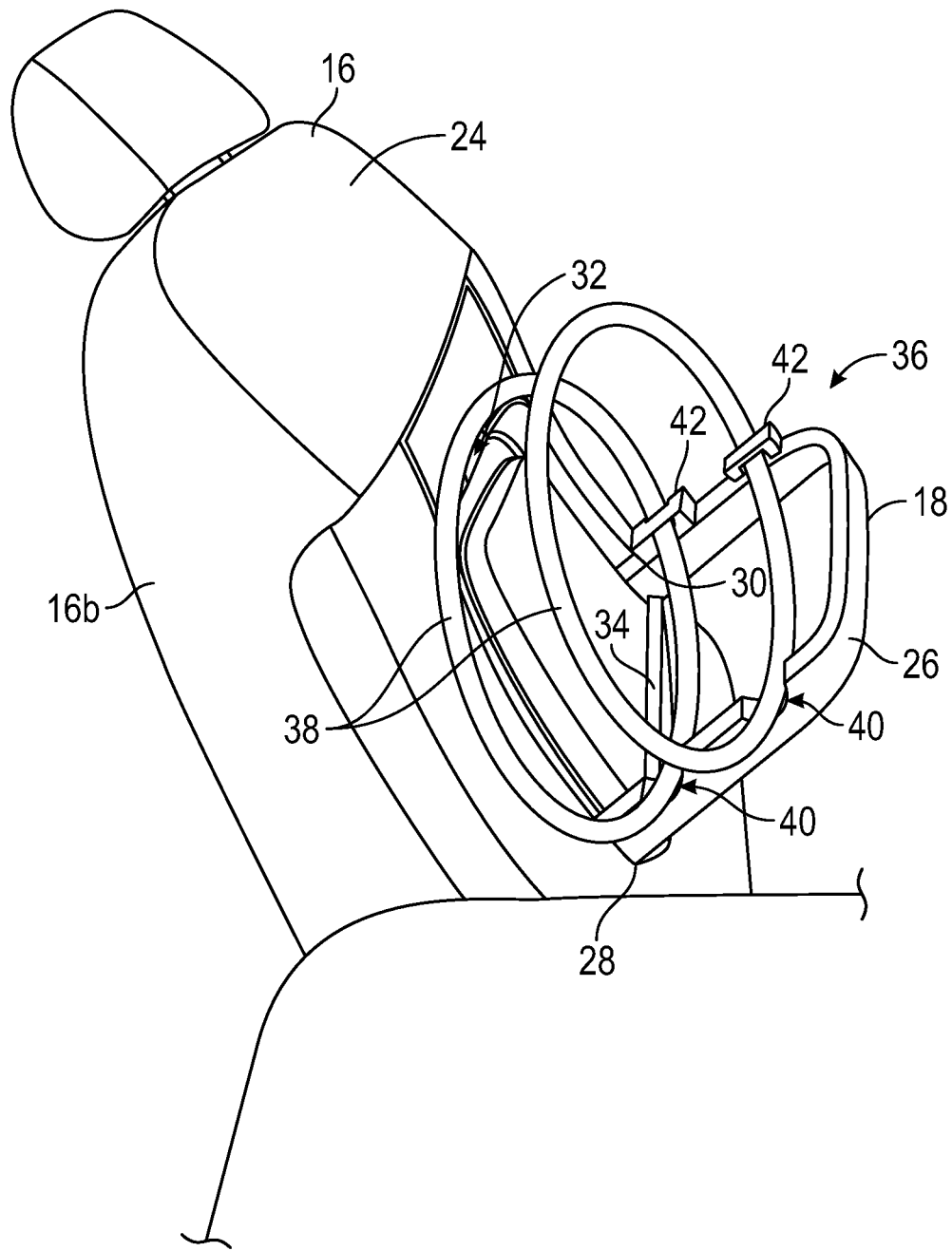
FIG. 5 is a second view of an embodiment of a storage apparatus at a seat back of a vehicle.

Referring now to FIGS. 4 and 5, an embodiment of a storage apparatus 18 is illustrated in more detail. The storage apparatus 18 is incorporated into the seat back 24, and is movable between a latched position, such as shown in FIG. 4, and an extended position, such as shown in FIG. 5. The storage apparatus 18 includes a u-shaped arm 26 secured to the seat back 24 at a first arm end 28 and a second arm end 30. The storage apparatus 18 pivots about the first arm end 28 and the second arm end 30 to move between the latched position and the extended position. As shown in FIG. 4, the storage apparatus 18 includes a latch 32 to secure the storage apparatus 18 in the latched position. The storage apparatus 18 is biased into the extended positioned by a biasing element 34, such as a spring element, such that when the latch 32 releases the arm 26, the arm 26 is urged toward the extended position.

As shown in FIG. 5, the arm 26 includes a retaining arrangement 36 to position and secure one or more mobility devices 20 and/or their components. For example, in FIG. 6, the retaining arrangement 36 is configured to position and secure the wheelchair wheels 38, which have been removed from a wheelchair frame 44, illustrated in FIG. 8. For positioning and storing of each wheelchair wheel 38, the retaining arrangement 36 includes a wheel recess 40 and a wheel retainer 42, such as a strap which wraps around a portion of the wheelchair wheel 38, at opposing ends of the arm 26. For example, in the embodiment illustrated herein, each wheelchair wheel 38 is located and secured to the arm 26 via a wheel recess 40 located nearer the first arm end 28 and a wheel retainer 42 located nearer the second arm end 30. The wheel recess 40 is, for example, a scallop or groove in the arm 26 in which the wheelchair wheel 38 is placed to locate the wheelchair wheel 38 on the arm 36. The wheel retainer 42 then is engaged to secure the wheelchair wheel 38 to the arm 26. In the embodiment of FIG. 5, two such retaining arrangements 36 are utilized to position and retain two wheelchair wheels 38 to the arm 26 when the arm 26 is in the extended position.

While in the illustrated embodiment, the storage apparatus 18 is configured to position and secure wheelchair wheels 38, in other embodiments the storage apparatus 18 may be configured to position and secure other items, such as a wheelchair frame, a wheelchair seat, a walker, a cane, crutches, personal items such as laptop bags, purses, oxygen tanks, or other items. The storage apparatus 18, and in particular the arm 26 may be configured to secure these and other items when the arm 26 is in the extended position.

Figure 6:
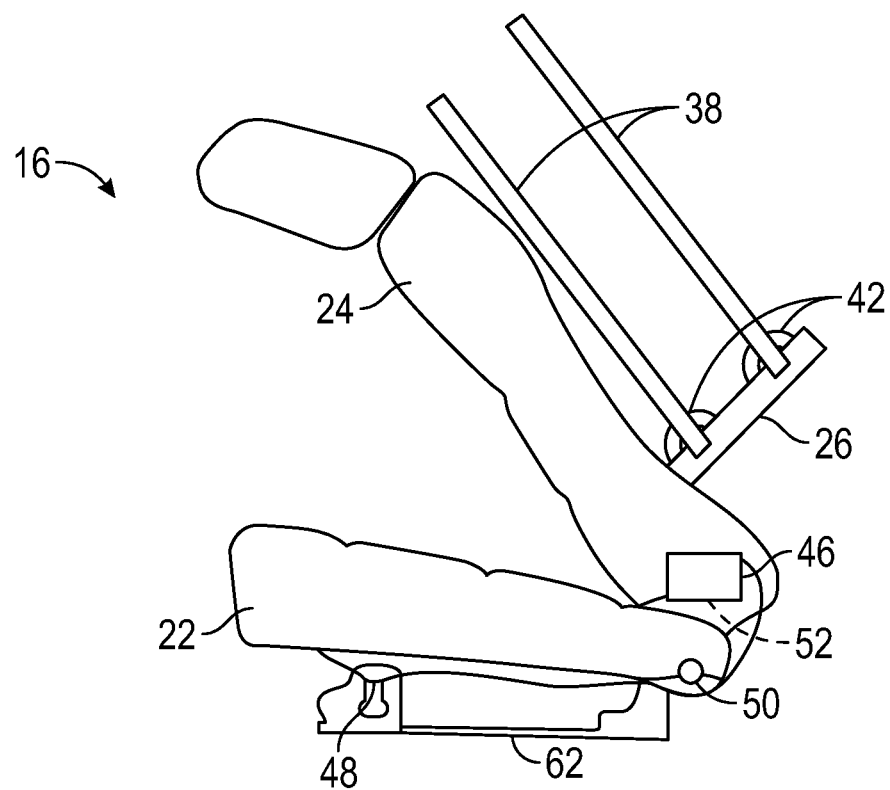
FIG. 6 is an illustration of a vehicle seat in a first position.
Figure 7:
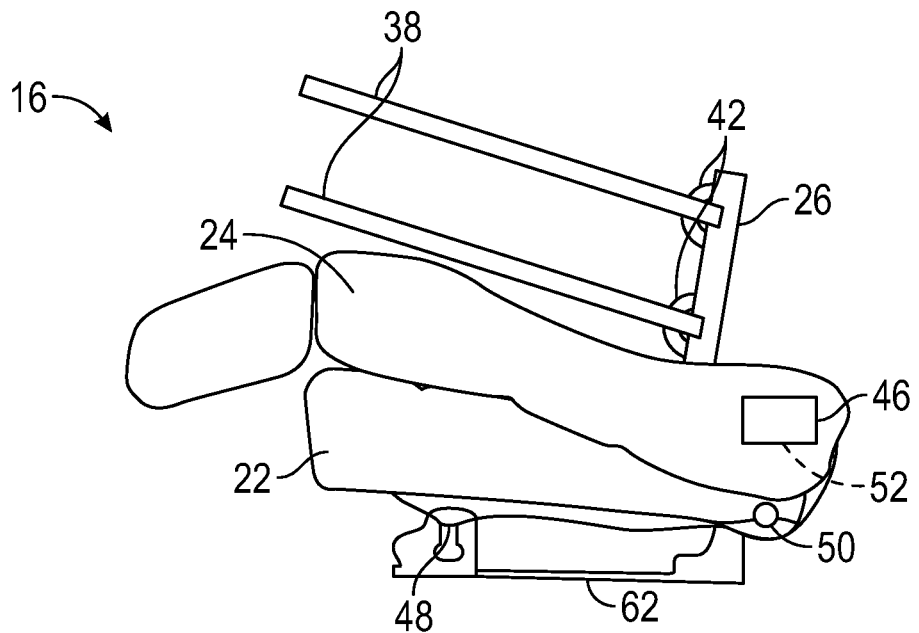
FIG. 7 is an illustration of a vehicle seat in a second position.
Figure 8:
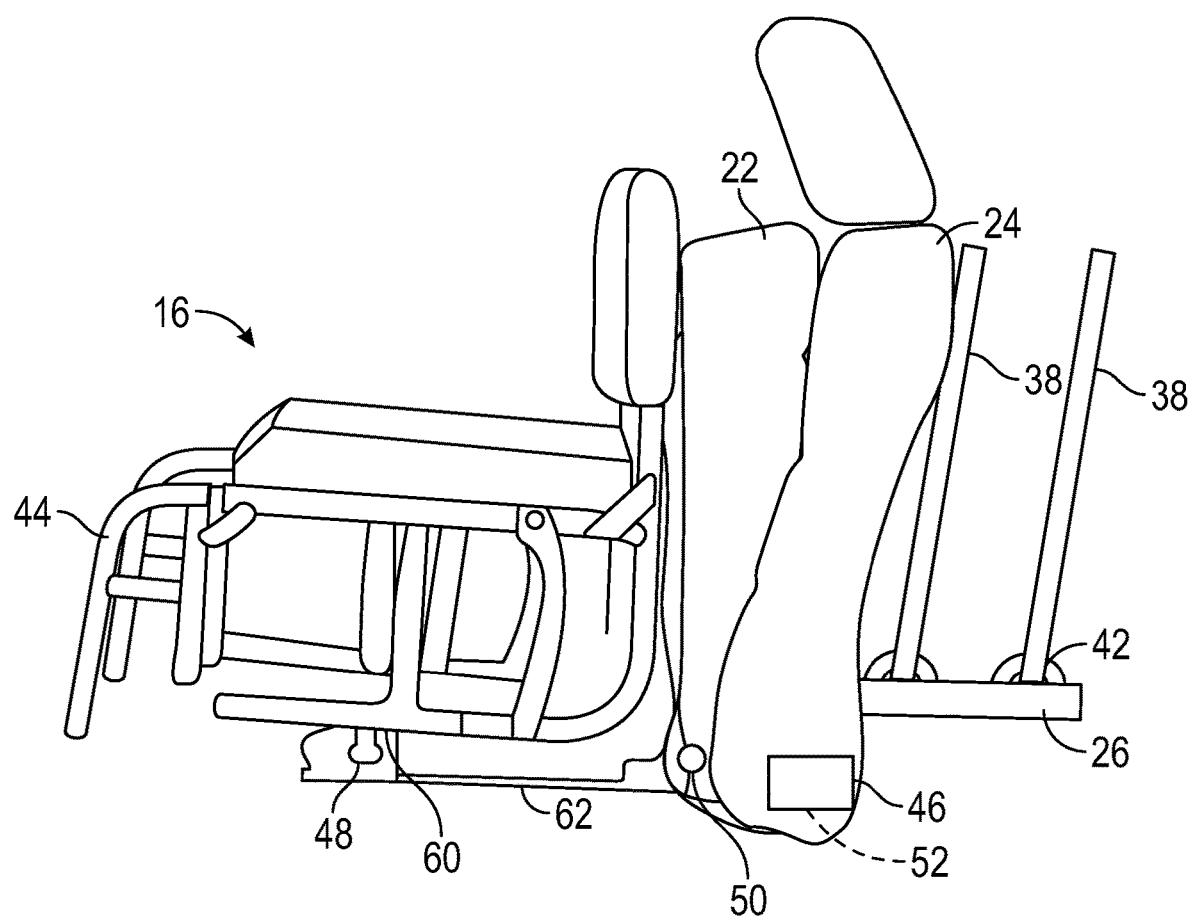
FIG. 8 is an illustration of a vehicle seat in a third position.

Referring to FIG. 6-8, illustrated is operation of the seat 16 to secure the wheels 38 and other items, such as a wheelchair frame 44 (illustrated in FIG. 8). First, shown in FIG. 6, the seat 16 is moved to a first position, in which the seat back 24 is moved to an angled forward position allowing for easy access to a rear side of the seat back 24. In some embodiments, this is accomplished by operation of a seat motor 46 operably connected to the seat 16. The arm 26 is moved to the extended position and the wheels 38 are loaded and secured to the arm 26 via the wheel recess 40 and the wheel retainer 42. The seat 16 is then moved to a second position, shown in FIG. 7, in which the seat back 24 is then fully lowered into a folded position over the seat base 22. The seat base 22 is unlatched at a forward latch 48 of the seat 16. This allows the seat 16 to be moved to a third position, as shown in FIG. 8, in which the seat base 22 is rotated about a seat pivot 50, until the seat base 22 is in a substantially vertical orientation. In some embodiments the seat base 22 is spring-loaded such that when the forward latch 48 is released, the seat base 22 is rotated to the vertical orientation automatically via a spring force. In other embodiments, the rotation of the seat base 22 is driven by the seat motor 46. Additional cargo, such as the wheelchair frame 44 may then be loaded in the vehicle 10 in a space once occupied by the seat base 22, and in some embodiments is secured in place by an integrated attachment 60 in a seat frame 62 of the seat 16.

In some embodiments, a controller 52 is operably connected to the seat 16 to command operation of the seat motor 46 to move the seat back 24 and the seat base 22, and also to disengage the forward latch 48. The controller 52 may be configured to operate the seat 16 at vehicle entry and at vehicle exit, which will be explained in further detail below.

Figure 9:
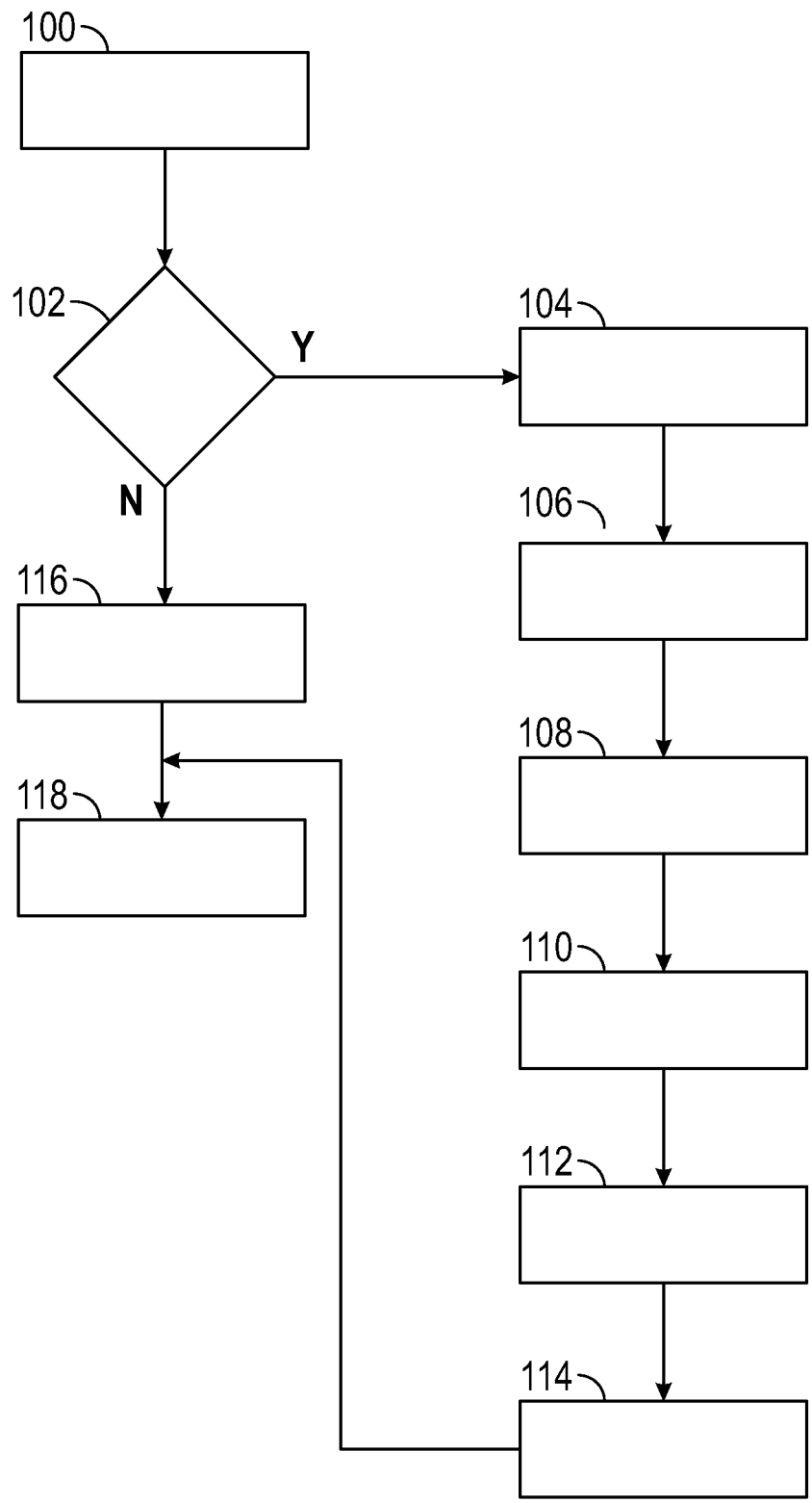
FIG. 9 is a schematic illustration of a method of operation of a seat and storage apparatus of a vehicle.

FIG. 9 illustrates a method of operating the seat 16 and the storage apparatus 18 at vehicle entry. At step 100 a vehicle door 54 (shown in FIG. 1) is opened. At step 102, the controller 52 determines if the vehicle operator needs storage of one or more mobility devices 20. This determination may be via a key fob button, a smart phone application which communicates with the controller 52, or the like. If the operator needs to utilize the storage apparatus 18, in step 104 the controller 52 commands movement of the seat back 22 to the first, tilted, position illustrated in FIG. 6. At step 106, the latch 32 is released and the arm 26 is moved from the latched position to the extended position. The components, such as the wheelchair wheels 38 are loaded into the arm 26 and secured thereat at step 108. At step 110, the controller 52 commands the seat back 22 to be moved to the second, fully folded, position as shown in FIG. 7. In some embodiments, the controller command is initiated by the operator pressing a button on the seat, for example, or by communication from the smart phone application to the controller 52. In some embodiments, the seat 16 also moves rearward to its furthest extent. At step 112, the controller commands release of the forward latch 48 of the seat 16 and the seat base 22 is rotated upward to the third, vertical, position illustrated in FIG. 8. At step 114, the operator places additional cargo, for example, the wheelchair frame 44 into the vehicle and is secured at the seat frame 62. Once the cargo is loaded and secured, the vehicle 10 is ready to drive at step 118. Alternatively, if it is determined that the operator does not need to utilize the storage apparatus 18, at step 116 the seat 16 is moved to a normal or design position, if not already there. The vehicle 10 is then ready to be driven at step 118.

Figure 10:
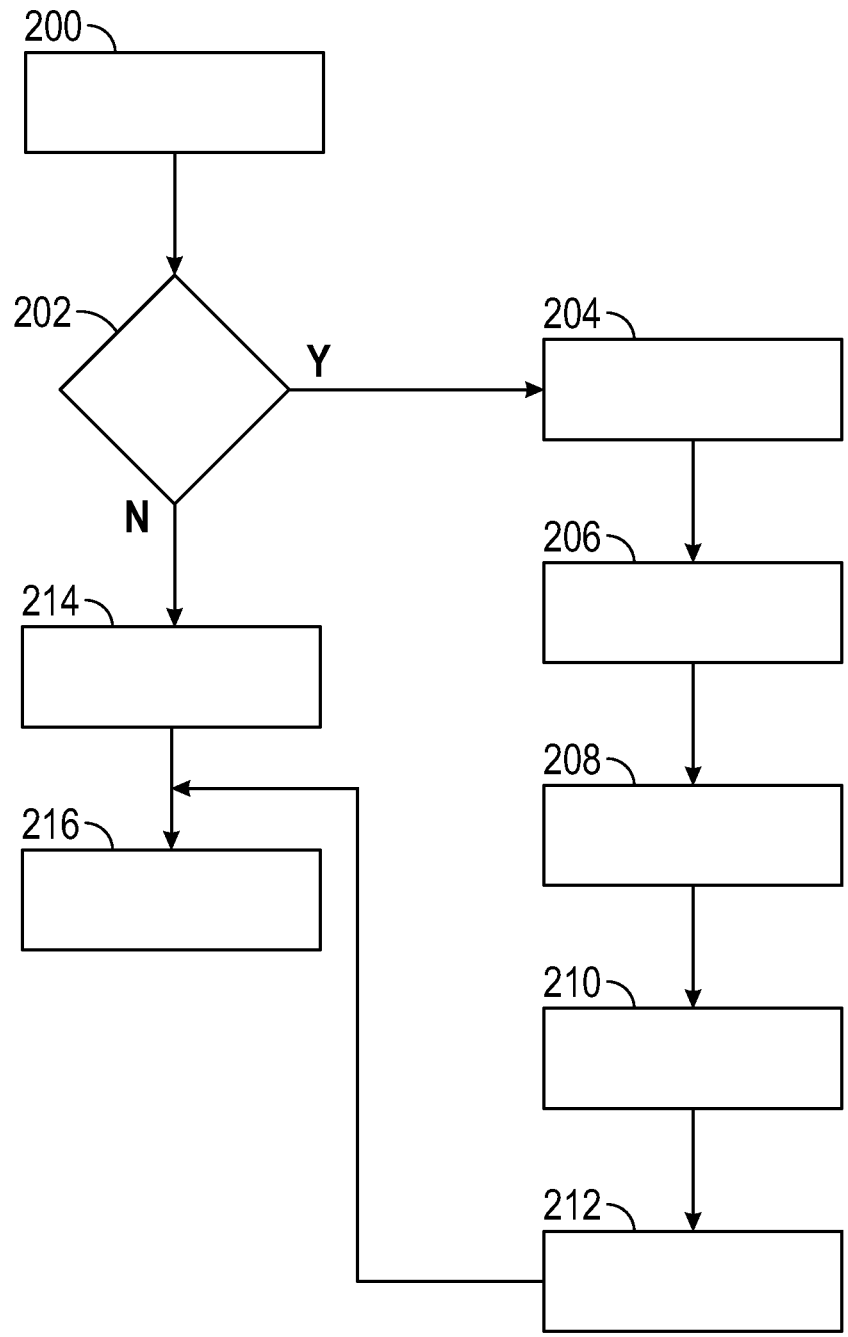
FIG. 10 another schematic illustration of a method of operation of a seat and storage apparatus of a vehicle.

FIG. 10 illustrates a method of operating the seat 16 and the storage apparatus 18 at vehicle exit. At step 200, the vehicle door 54 is opened, and the controller 52 determines if the storage apparatus 18 is in use at step 202. At step 204, the wheelchair frame 44 is removed from the seat frame 62. At step 206, the vehicle operator places the wheelchair frame 44 at a selected location outside of the vehicle 10, and the controller 52 commands rotation of the seat base 22 from the third position downward to the second position and into engagement of the forward latch 48 at step 208. This command may be initiated by the vehicle operator pressing a button on the seat 16 or via communication from the vehicle operator to the controller 52 via, for example, a smart phone application or the like. Alternatively, the forward latch 48 may be engaged manually, by the operator moving the seat base 22 down until the forward latch 48 is engaged. Once the forward latch 48 is engaged, the seat back 22 is moved to the first, tilted, position at step 210. In some embodiments, this movement may begin automatically when the forward latch 48 is engaged. At step 212, the wheels 28 are removed from the arm 18 and placed in the selected location outside of the vehicle 10. At step 216 the vehicle 10 is successfully exited. If the controller 52 determines that the storage apparatus 18 is not in use at step 202, the seat 16 is moved to the normal or design position at step 214. And the vehicle 10 is successfully exited at step 216.

The present disclosure provides an efficient and safe storage apparatus 18 and method of loading and storing mobility devices 20 and other cargo in the vehicle 10. The movement of the seat 16 is motorized or automatic, which is beneficial for those operators with limited mobility and/or dexterity. The disclosed storage apparatus prevents items from being unsecured in the vehicle 10 while driving, and provides a solution in which the time and effort required to load and unload the mobility devices 20 from the vehicle 10 is reduced.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle seat assembly, comprising:
   a seat base;
   a seat back extending from the seat base; and
   a storage apparatus connected to the seat back, the storage apparatus movable from a stowed position against the seat back to an extended position away from the seat back, the storage apparatus configured to position and secure one or more cargo items;
   wherein the storage apparatus includes:
      an arm connected to the seat back at a first arm end and a second arm end, the arm pivotably connected to the seat back to move from the stowed position to the extended position; and
      a latch to secure the arm in the stowed position;
   wherein the one or more cargo items includes one or more wheels, the arm including an arm groove and an arm strap configured to position and secure the one or more wheels.

2. The vehicle seat assembly of claim 1, further comprising an arm spring element to bias the arm toward the extended position.

3. The vehicle seat assembly of claim 1, wherein the arm includes one or more features to position and retain one or more cargo items at the arm.

4. The vehicle seat assembly of claim 1, further comprising a seat motor configured to move the seat back from a first position extending upward from the seat base to a second position where the seat back is disposed flat against the seat base.

5. The vehicle seat of assembly claim 4, wherein the seat motor is activated via a button on the seat.

6. The vehicle seat assembly of claim 1, wherein the seat base is movable from a horizontal position to a vertical position via rotation of the seat base about a seat pivot.

7. A vehicle seat and storage system, comprising:
a vehicle seat including:
a seat base; and
a seat back extending from the seat base;
a storage apparatus connected to the seat back, the storage apparatus movable from a stowed position against the seat back to an extended position away from the seat back, the storage apparatus configured to position and secure one or more cargo items; and
a seat motor operably connected to the seat, the seat motor configured to move the seat back from a first position extending upward from the seat base to a second position where the seat back is disposed flat against the seat base;
wherein the storage apparatus includes:
an arm connected to the seat back at a first arm end and a second arm end, the arm pivotably connected to the seat back to move from the stowed position to the extended position; and
a latch to secure the arm in the stowed position;
wherein the one or more cargo items includes one or more wheels, the arm including an arm groove and an arm strap configured to position and secure the one or more wheels.

8. The vehicle seat and storage system of claim 7, further comprising a controller operably connected to the vehicle seat and the seat motor, the controller configured to determine if use of the storage system is needed, and commands movement of the seat back from the first position to the second position.

9. The vehicle seat and storage system of claim 8, wherein the determination is made via communication between the controller and one of a key fob or a smart phone application.

10. The vehicle seat and storage system of claim 7, further comprising an arm spring element to bias the arm toward the extended position.

11. The vehicle seat and storage system of claim 7, wherein the arm includes one or more features to position and retain one or more cargo items at the arm.

12. The vehicle seat and storage system of claim 7, wherein the seat base is movable from a horizontal position to a vertical position via rotation of the seat base about a seat pivot.

13. A method of operating a vehicle seat and storage apparatus, comprising:
determining a whether a vehicle operator requires use of the storage apparatus, the storage apparatus including:
an arm connected to the seat back of a vehicle seat at a first arm end and a second arm end, the arm pivotably connected to the seat back to move from a stowed position against the seat back to an extended position away from the seat back; and
a latch to secure the arm in the stowed position;
moving the seat to a first position where the seat back is moved forward a selected amount;
releasing the latch to move the arm to the extended position;
securing one or more cargo items to the arm;
moving the seat to a second position where the seat back is folded against the seat base; and
moving the seat to a third position where the seat base is moved from a horizontal orientation in the vehicle to a vertical orientation in the vehicle by rotating the seat about a seat pivot;
wherein the one or more cargo items includes one or more wheels, the arm including an arm groove and an arm strap configured to position and secure the one or more wheels.

14. The method of claim 13, further comprising securing one or more additional cargo items to one of a seat frame or the seat base when the seat base is in the vertical orientation.

15. The method of claim 13, further comprising releasing a forward latch to move the seat base to the vertical orientation.

16. The method of claim 13, wherein the arm moves to the extended position via a spring force.

17. The method of claim 13, wherein the seat base is moved to the vertical orientation via a spring force.

18. The method of claim 13, wherein the seat back is moved to the first position and the second position via operation of a seat motor.

* * * * *